US012586470B2

(12) United States Patent (10) Patent No.: US 12,586,470 B2

Yamauchi (45) Date of Patent: Mar. 24, 2026

(54) EXIT ASSIST DEVICE AND EXIT ASSIST METHOD

(71) Applicants: TOYOTA JIDOSHA KABUSHIKI KAISHA, Toyota (JP); DENSO CORPORATION, Kariya-city (JP)

(72) Inventor: Koichiro Yamauchi, Tokyo-to (JP)

(73) Assignees: TOYOTA JIDOSHA KABUSHIKI KAISHA, Toyota (JP); DENSO CORPORATION, Kariya-city (JP)

( * ) Notice: Subject to any disclaimer, the term of this patent is extended or adjusted under 35 U.S.C. 154(b) by 15 days.

(21) Appl. No.: 18/774,251

(22) Filed: Jul. 16, 2024

(65) Prior Publication Data

US 2025/0029497 A1 Jan. 23, 2025

(30) Foreign Application Priority Data

Jul. 20, 2023 (JP) ................................. 2023-118261

(51) Int. Cl.
*G08G 1/16* (2006.01)
*G06F 3/01* (2006.01)

(52) U.S. Cl.
CPC ............. *G08G 1/168* (2013.01); *G06F 3/013* (2013.01)

(58) Field of Classification Search
None
See application file for complete search history.

(56) References Cited

U.S. PATENT DOCUMENTS

| | | | |
|---|---|---|---|
| 11,562,550 B1* | 1/2023 | Asghar | ................... G06F 3/012 |
| 2016/0075374 A1* | 3/2016 | Yamashita | ......... B62D 15/0285 |
| | | | 701/41 |
| 2017/0124407 A1* | 5/2017 | Micks | .................... G06V 40/20 |
| 2017/0267252 A1* | 9/2017 | Park | ..................... B60W 30/14 |
| 2019/0221124 A1 | 7/2019 | Takeyama et al. | |
| 2023/0314157 A1* | 10/2023 | Weiss | .................... G06V 20/20 |
| | | | 345/423 |

FOREIGN PATENT DOCUMENTS

| | | |
|---|---|---|
| JP | 2006-071425 A | 3/2006 |
| JP | 2007-253819 A | 10/2007 |
| JP | 2019-125039 A | 7/2019 |

* cited by examiner

*Primary Examiner* — Peter D Nolan
*Assistant Examiner* — Jacob Kent Besteman-Street
(74) *Attorney, Agent, or Firm* — Dinsmore & Shohl LLP

(57) ABSTRACT

An exit assist device has a processor configured to estimate a direction of a line of sight of a driver based on an image in which the vicinity of the driving seat is represented, and to decide on an exiting direction in which the vehicle is to exit from a parking space, based on the direction of the line of sight of the driver.

4 Claims, 5 Drawing Sheets

LINE OF SIGHT

EXIT ASSIST DEVICE AND EXIT ASSIST METHOD

CROSS-REFERENCE TO RELATED APPLICATIONS

This application claims priority to Japanese Patent Application No. 2023-118261 filed Jul. 20, 2023, the entire contents of which are herein incorporated by reference.

FIELD

The present disclosure relates to an exit assist device and to an exit assist method.

BACKGROUND

Parking assist devices have been previously proposed to assist parking of vehicles in parking spaces. A parking assist device recognizes a parking space and assists parking operation to park a vehicle in the parking space while maintaining suitable distances between the vehicle and other adjacent vehicles.

One parking assist device that has been proposed for use when a driver is to park a vehicle in a parking space, identifies one parking space in which the vehicle is to be parked from among multiple parking spaces, based on a direction of a line of sight of the driver (see Japanese Unexamined Patent Publication No. 2006-071425). The driver can thus notify the parking assist device of the desired parking space without performing a specific operation to indicate the parking space.

SUMMARY

When a driver causes a parked vehicle to exit a parking space, the parking assist device helps the vehicle exit in the direction indicated by driver operation.

Before starting the vehicle, the driver performs operations such as adjusting the driving seat position, setting the navigation device, and setting the air conditioner.

It is desirable to alleviate the burden on the driver before the vehicle exits the parking space.

It is an object of the present disclosure to provide an exit assist device that assists a vehicle in exiting its parking space in a manner based on the line of sight of the driver.

(1) One embodiment of the present disclosure provides an exit assist device. The exit assist device has a processor configured to estimate a direction of a line of sight of a driver based on an image in which a vicinity of a driving seat is represented, and decide on an exiting direction in which a vehicle is to exit from a parking space, based on the direction of the line of sight of the driver.

(2) In the exit assist device of embodiment (1) above, the processor is further configured to recognize multiple directions in which the vehicle can exit, based on information representing surrounding environment of the vehicle, and decide on the exiting direction from among the multiple recognized directions, based on the direction of the line of sight of the driver.

(3) In the exit assist device of embodiment (1) above, the processor is further configured to decide on the exiting direction as the direction with the longest time for orientation of the line of sight of the driver from among the multiple recognized directions.

(4) In the exit assist device of embodiment (2) above, the processor is further configured to detect a number of moves for which objects move around the vehicle, based on information representing surrounding environment of the vehicle, and decide that the exiting direction is the direction opposite from the direction with the longest time for orientation of the line of sight of the driver from among the multiple recognized directions, when the detected number of moves exceeds a predetermined reference value, or decide that the exiting direction is the direction with the longest time for orientation of the line of sight of the driver from among the multiple recognized directions, when the detected number of moves does not exceed the reference value.

(5) Another embodiment of the present disclosure provides an exit assist method. The exit assist method is carried out by an exit assist device and the method includes estimating a direction of a line of sight of a driver based on an image in which a vicinity of a driving seat is represented, and deciding on an exiting direction in which a vehicle is to exit from a parking space, based on the direction of the line of sight of the driver.

The exit assist device of the present disclosure assists a vehicle in exiting its parking space in a manner based on the line of sight of the driver, thus helping to alleviate burden on the driver.

The object and aspects of the present disclosure will be realized and attained by the elements and combinations particularly specified in the claims. It is to be understood that both the foregoing general description and the following detailed description are exemplary and explanatory and are not restrictive of the present disclosure, as claimed.

DESCRIPTION OF EMBODIMENTS

Figure 1A:
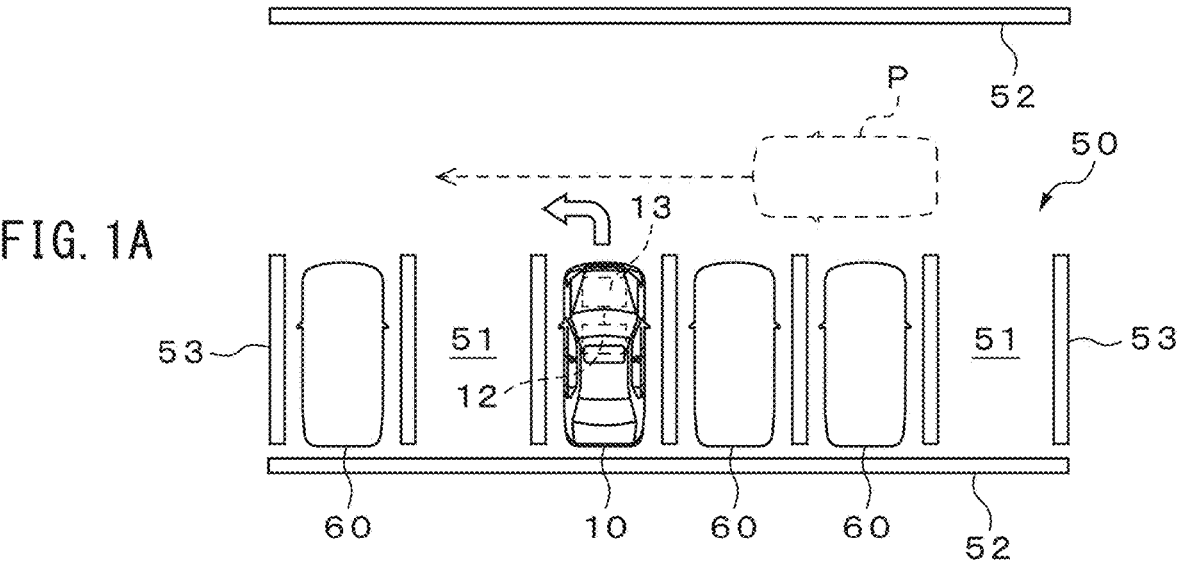
FIG. 1A is a diagram illustrating operation of the assist device of the embodiment in overview, and showing a vehicle parking in a parking space.
Figure 1B:
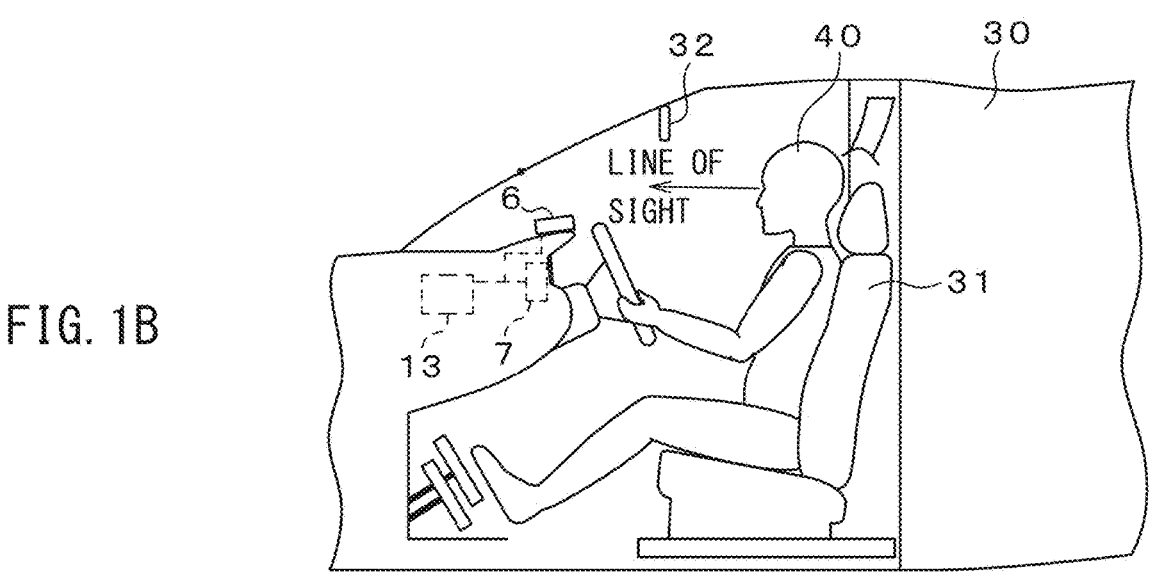
FIG. 1B is a diagram illustrating operation of the assist device of the embodiment in overview, and showing the inside of the vehicle.

FIG. 1A and FIG. 1B are diagrams showing operation of an assist device 13 according to an embodiment in overview. FIG. 1A shows a vehicle 10 parked in a parking space 51, while FIG. 1B shows the interior of the cabin 30. The assist device 13 is an example of an exit assist device.

As shown in FIG. 1A, the vehicle 10 has an automatic control device 12 and the assist device 13. The automatic control device 12 controls operation of the vehicle 10. The assist device 13 assists parking of the vehicle 10 and exiting of the vehicle 10. The vehicle 10 may also be a self-driving vehicle.

The vehicle 10 parks in one parking space 51 in a parking lot 50 having multiple parking spaces 51. The parking lot is a region delineated by a pair of marking lines 52, 52. The parking space 51 is defined by a pair of marking lines 53 and one marking line 52. Another vehicle 60 is parked beside the vehicle 10.

The vehicle 10 is parked backwards in the parking space 51. The vehicle 10 can move to the left side or right side after exiting the parking space 51.

The driver 40 boards the vehicle 10 to exit with the vehicle 10. The driver 40 sits in a driving seat 31 in the cabin 30 of the vehicle 10. The assist device 13 is activated when the ignition is turned on. The driver 40 operates a user interface 7, and initiates an exit assist operation whereby the assist device 13 assists in exiting of the vehicle 10.

Since the driver 40 plans to exit to the left side, the line of sight is directed toward the left side in the forward orientation of the vehicle 10, after having sat down in the driving seat 31.

The assist device 13 estimates the direction of the line of sight of the driver 40 based on a monitor image which includes the face of the driver 40, taken by a monitoring camera 6. The assist device 13 determines that the line of sight of the driver 40 is directed toward the left side in the forward orientation of the vehicle 10.

Since the line of sight of the driver 40 is directed toward the left side with respect to the forward orientation of the vehicle 10, the assist device 13 determines that the exiting direction, for exiting of the vehicle 10 from the parking space 51, is the left side with respect to the forward orientation of the vehicle 10. The automatic control device 12 drives the vehicle 10 so that it exits to the left side from the parking space 51. The exiting direction is the direction of forward movement after the vehicle 10 has exited the parking space 51.

As mentioned above, since the vehicle 10 is assisted to exit from its parking space 51 in a manner based on the direction of the line of sight of the driver 40, it can alleviate burden on the driver 40.

Figure 2:
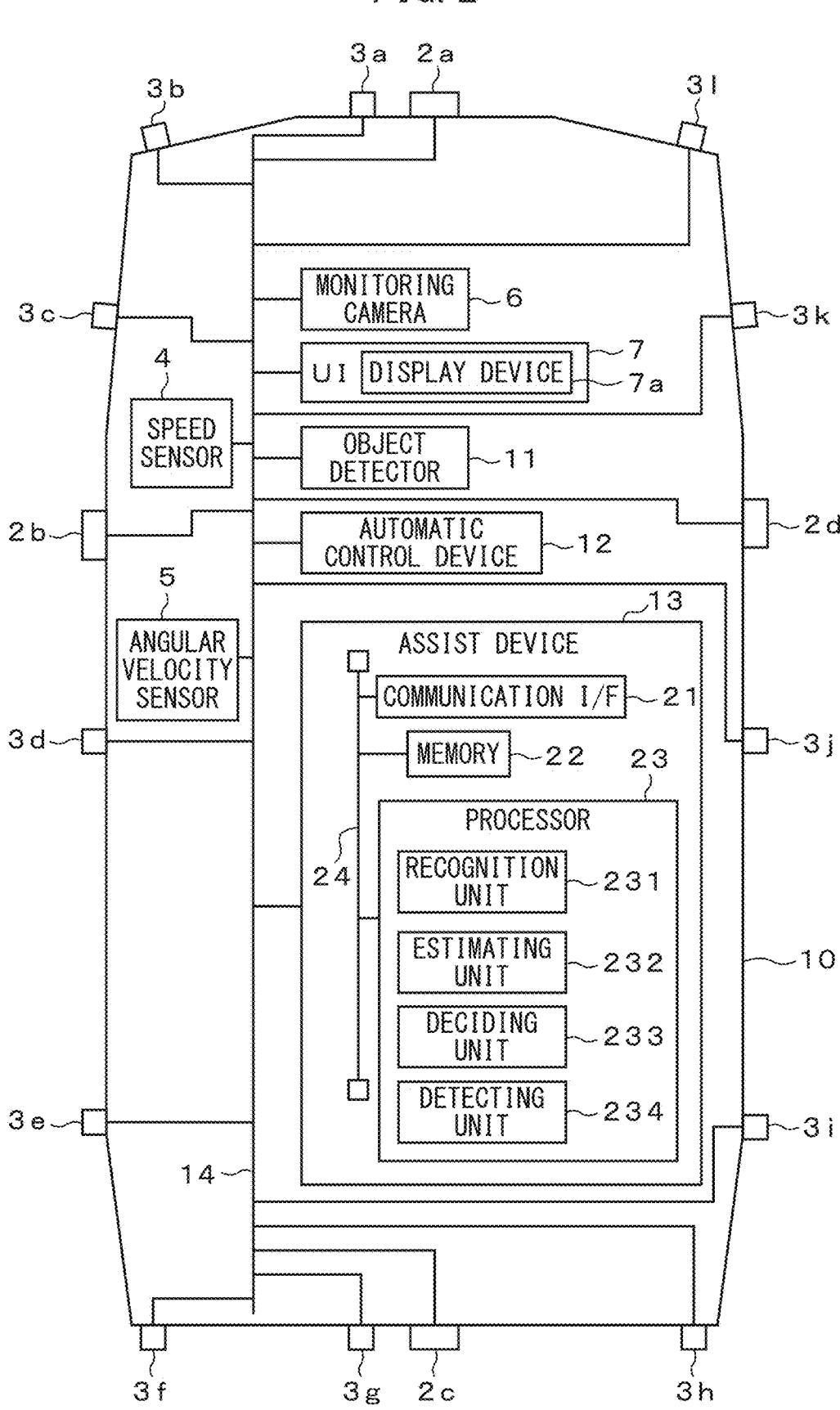
FIG. 2 is a hardware configuration diagram for a vehicle in which the assist device of the embodiment is mounted.

FIG. 2 is a hardware configuration diagram for a vehicle 10 in which the assist device 13 of the embodiment is mounted. The vehicle 10 has camera sensors 2a to 2d, sonar sensors 3a to 3l, a speed sensor 4, an angular velocity sensor 5, a monitoring camera 6, a user interface (UI) 7, an object detector 11, an automatic control device 12 and an assist device 13, etc.

The camera sensors 2a to 2d, sonar sensors 3a to 3l, speed sensor 4, angular velocity sensor 5, monitoring camera 6, user interface (UI) 7, object detector 11, automatic control device 12 and assist device 13 are connected in a communicable manner via an in-vehicle network 14 conforming to the Controller Area Network standard.

The camera sensors 2a to 2d acquire surrounding images representing the surrounding environment of the vehicle 10, at a surrounding image acquisition time set with a predetermined cycle. The camera sensors 2a to 2d output acquired surrounding images, together with their surrounding image acquisition times, to the object detector 11 via the in-vehicle network 14. At the object detector 11, each surrounding image is used for processing to detect other objects surrounding the vehicle 10.

The camera sensor 2a is situated at the front of the vehicle 10, the camera sensor 2b is situated on the left side of the vehicle 10, the camera sensor 2c is situated at the rear of the vehicle 10, and the camera sensor 2d is situated on the right side of the vehicle 10.

The camera sensors 2a to 2d each have a 2D detector composed of an array of photoelectric conversion elements with visible light sensitivity, such as a CCD or C-MOS, and an imaging optical system that forms an image of the photographed region on the 2D detector. The surrounding image is an example of surrounding environment information.

The sonar sensors 3a to 3l emit sound waves at a reflected wave information acquisition time set with a predetermined cycle, and receive reflected waves that have been reflected by reflectors. The time required for waves reflected by the reflectors to return using the sonar sensors 3a to 3l contains information for the distance between the vehicle 10 and objects located in the direction in which the sound waves have been emitted. Each of the sonar sensors 3a to 3l outputs the reflected wave information that includes the sound wave emission direction and the time required for the reflected wave to return, together with the reflected wave information acquisition time at which the sound waves were emitted, through the in-vehicle network 14 to the object detector 11. At the object detector 11, the reflected wave information is used for processing to detect objects surrounding the vehicle 10. The sonar sensors 3a to 3l may employ ultrasonic sensors, for example. The reflected wave information is an example of surrounding environment information.

The sonar sensors 3a, 3b, 31 are situated at the front of the vehicle 10, the sonar sensors 3c to 3e are situated on the left side of the vehicle 10, the sonar sensors 3f to 3h are situated at the rear of the vehicle 10 and the sonar sensors 3i to 3k are situated on the right side of the vehicle 10.

The speed sensor 4 detects information for the speed of the vehicle 10, and outputs the vehicle speed information and the speed information acquisition time at which the vehicle speed information was acquired, to the automatic control device 12 and assist device 13, through the in-vehicle network 14. The speed sensor 4 is mounted on an axle (not shown), for example, and detects the rotational speed of the axle, outputting a pulse signal in proportion to the rotational speed.

The angular velocity sensor 5 detects the yaw rate of the vehicle 10, and outputs the yaw rate and a yaw rate information acquisition time at which the yaw rate was acquired, to the automatic control device 12 and assist device 13, through the in-vehicle network 14. A gyroscope, for example, may be used as the angular velocity sensor 5.

The monitoring camera 6 is an example of an image acquisition unit. The monitoring camera 6 acquires a monitor image representing the surroundings of the driving seat 31 at a monitor image acquisition time at a predetermined cycle. The monitor image also includes the face of the driver 40 sitting in the driving seat 31. The monitoring camera 6 is disposed on the dashboard, for example.

The monitoring camera 6 has a 2D detector composed of an array of photoelectric conversion elements with infrared sensitivity, such as a CCD or C-MOS, and an imaging optical system that forms an image of the acquired region on the 2D detector.

Each time a monitor image is acquired, the monitoring camera 6 outputs the monitor image and the image acquisition time at which the monitor image was acquired, to the assist device 13 via the in-vehicle network 14. The monitor images are used by the assist device 13 to estimate the direction of the line of sight of the driver.

The UI 7 is an example of the notification unit. The UI 7, controlled by the automatic control device 12 or assist device 13, relays information relating to the vehicle 10 to the driver 40. For example, the UI 7 is controlled by the assist device 13 to notify the driver 40 of the exiting direction of the vehicle 10. The UI 7 has a display device 7a such as a liquid crystal display or touch panel, for display of the information. The UI 7 may also have an acoustic output device (not shown) to relay the information to the driver 40. The UI 7 also has a touch panel or operating button, for example, as an input device for inputting operation information from the driver 40 to the vehicle 10. The operation information may include, for example, operation required for assisting parking or exiting. The UI 7 outputs the input operation information to the automatic control device 12 or assist device 13 via the in-vehicle network 14.

The object detector 11 detects objects around the vehicle 10, and their types, based on the surrounding image. Objects include other vehicles, pedestrians and marking lines defining parking spaces, which are located around the vehicle 10. The object detector 11 has an classifier that detects objects represented in a surrounding image, by input of the image, for example.

The classifier may use a deep neural network (DNN) that has been trained to detect objects represented in input images, for example. The object detector 11 may also use a classifier other than a DNN. For example, the classifier used by the object detector 11 may be a support vector machine (SVM) that has been trained to output a confidence factor for representation of objects to be detected in the window, with the input being a feature descriptor (such as Histogram of Oriented Gradients, HOG, for example) calculated from a window set in the surrounding images. Alternatively, the object detector 11 may detect an object region by template matching between the image and a template in which an object to be detected is represented.

The object detector 11 may also detect other objects around the vehicle 10 based on reflected wave information output by the sonar sensors 3a to 3l. The object detector 11 may also determine the orientation of an object with respect to the vehicle 10 based on the location of the object in the surrounding image, and may determine the distance between the object and the vehicle 10, based on the orientation and on the reflected wave information. The object detector 11 estimates the location of the object represented in a vehicle coordinate system, for example, based on the current location of the vehicle 10, and the distance of the object from the vehicle 10 and its orientation.

When marking lines on the ground have been detected, the object detector 11 also estimates the locations of the marking lines based on internal parameters such as the focal lengths of the camera sensors 2a to 2d, and external parameters such as the installed locations and installed orientations of the camera sensors 2a to 2d.

The object detector 11 relays object detection information which includes information representing the types of objects that were detected and information indicating their locations, to the automatic control device 12 or assist device 13, via the in-vehicle network 14. For example, the object detector 11 may use optical flow to attach identification information and track similar objects. Such identification information is included in the object detection information.

The automatic control device 12 controls operation of the vehicle 10. The automatic control device 12 has a self-driving mode in which the vehicle 10 is driven by automatic control, and a manual driving mode in which operation of the vehicle 10 is controlled based on driver 40 manipulation. In self-driving mode, the vehicle 10 is driven primarily by the automatic control device 12. In self-driving mode, the automatic control device 12 controls operations such as steering, engine actuation and braking based on detection information from the camera sensors 2a to 2d and sonar sensors 3a to 3k mounted in the vehicle 10.

In self-driving mode, the automatic control device 12 also parks the vehicle 10 in the parking space or causes the vehicle 10 to exit from the parking space, based on assist information relayed by the assist device 13.

In manual driving mode, the automatic control device 12 controls operation of the vehicle 10 including steering, actuation and braking based on manipulation by the driver 40. In manual driving mode, the vehicle 10 is driven primarily by the driver 40. In manual driving mode, the automatic control device 12 controls operation of the vehicle 10 based on operation of at least one from among the steering wheel, brake pedal and accelerator pedal by the driver 40.

The assist device 13 carries out recognition processing, estimation processing, decision processing and detection processing. For this purpose, the assessment assist device 13 has a communication interface (IF) 21, a memory 22 and a processor 23. The communication interface 21, memory 22 and processor 23 are connected via signal wires 24. The communication interface 21 has an interface circuit to connect the assist device 13 with the in-vehicle network 14.

The memory 22 is an example of a storage unit, and it has a volatile semiconductor memory and a non-volatile semiconductor memory, for example. The memory 22 stores an application computer program and various data to be used for information processing carried out by the processor 23.

All or some of the functions of the assist device 13 are functional modules driven by a computer program operating on the processor 23, for example. The processor 23 has a recognition unit 231, an estimating unit 232, a deciding unit 233 and a detecting unit 234. Alternatively, the functional module of the processor 23 may be a specialized computing circuit in the processor 23. The processor 23 comprises one or more CPUs (Central Processing Units) and their peripheral circuits. The processor 23 may also have other computing circuits such as a logical operation unit, numerical calculation unit or graphics processing unit.

The object detector 11, automatic control device 12 and assist device 13 are electronic control units (ECU), for example. For FIG. 2, the object detector 11, automatic control device 12 and assist device 13 were described as separate devices (for example, the Electronic Control Unit: ECU), but all or some of the devices may also be constructed as a single device.

Operation in which the assist device 13 assists parking of the vehicle 10 in a parking space will now be explained. As an example in which the vehicle 10 is at a location in front of a parking space in which it is expected to park (location P in FIG. 1A), the driver 40 operates the UI 7 to make a parking assist request.

When a parking assist request is made, the automatic control device 12 moves straight ahead by a predetermined distance from the current location of the vehicle 10 (the dashed arrow in FIG. 1A). The estimating unit 232 begins to estimate the direction of the line of sight of the driver 40 based on a monitor image. The direction of the line of sight is represented as an angle in the horizontal direction with respect to the forward orientation of the vehicle 10.

The estimating unit 232 identifies the locations of predetermined parts of the face such as the eye corners or inner eyes in acquired monitor images, by inputting the monitor images into a classifier trained to detect those predetermined parts of the face. The estimating unit 232 determines the locations of the pupil centers and eye centers based on the location of the eye corners or inner eyes, and estimates the direction of the line of sight of the driver 40 to be the direction connecting the locations of the eye centers and pupil centers.

The recognition unit 231 estimates the current location and orientation of the vehicle 10 based on the speed information and yaw rate. The recognition unit 231 also acquires the locations of marking lines and objects surrounding the vehicle 10, based on object detection information input from the object detector 11, and stores the marking line and object locations represented in the vehicle coordinate system.

The recognition unit 231 recognizes as a parking space any space where it is possible for the vehicle 10 to park based on the locations of marking lines and objects surrounding the vehicle 10. The deciding unit 233 decides that the parking space in which the vehicle 10 is to park is a particular parking space at a location matching the direction of the line of sight of the driver 40 as estimated by the estimating unit 232, from among the parking spaces recognized by the recognition unit 231.

The deciding unit 233 outputs the parking space information representing the location of the parking space, to the automatic control device 12 via the in-vehicle network 14. The automatic control device 12 parks the vehicle 10 in the parking space represented in the parking space information. In the example shown in FIG. 1A, the vehicle 10 is parked backwards in the parking space 51.

The recognition unit 231 recognizes whether the vehicle 10 is to exit forwards or to exit backwards when the vehicle 10 exits from the parking space. The recognition unit 231 also recognizes the direction in which it can exit. The direction in which the vehicle can exit indicates whether the vehicle 10 will further proceed to the left side, the right side or straight ahead after having exited the parking space.

The recognition unit 231 identifies the direction in which the vehicle 10 can travel from the parking space, based on the locations of marking lines and objects surrounding the vehicle 10, determining whether it is to exit forwards or backwards. The recognition unit 231 also recognizes the direction in which it can exit. In the example shown in FIG. 1A, the recognition unit 231 determines that the vehicle can exit to the left side and right side with respect to the front of the vehicle 10 after it has exited forwards.

The recognition unit 231 represents the direction in which the vehicle 10 can exit as an angle in the horizontal direction with respect to the front of the vehicle 10. The direction in which it can exit to the left side may be in the range of −90° to −30°, with 0° as the forward orientation of the vehicle 10. The direction in which it can exit to the right side may be in the range of +30° to +90°, with 0° as the forward orientation of the vehicle 10.

The recognition unit 231 notifies the deciding unit 233 of the front-back direction representing whether the vehicle 10 can exit forwards or can exit backwards from the parking space, and the direction in which it can exit.

Figure 3:
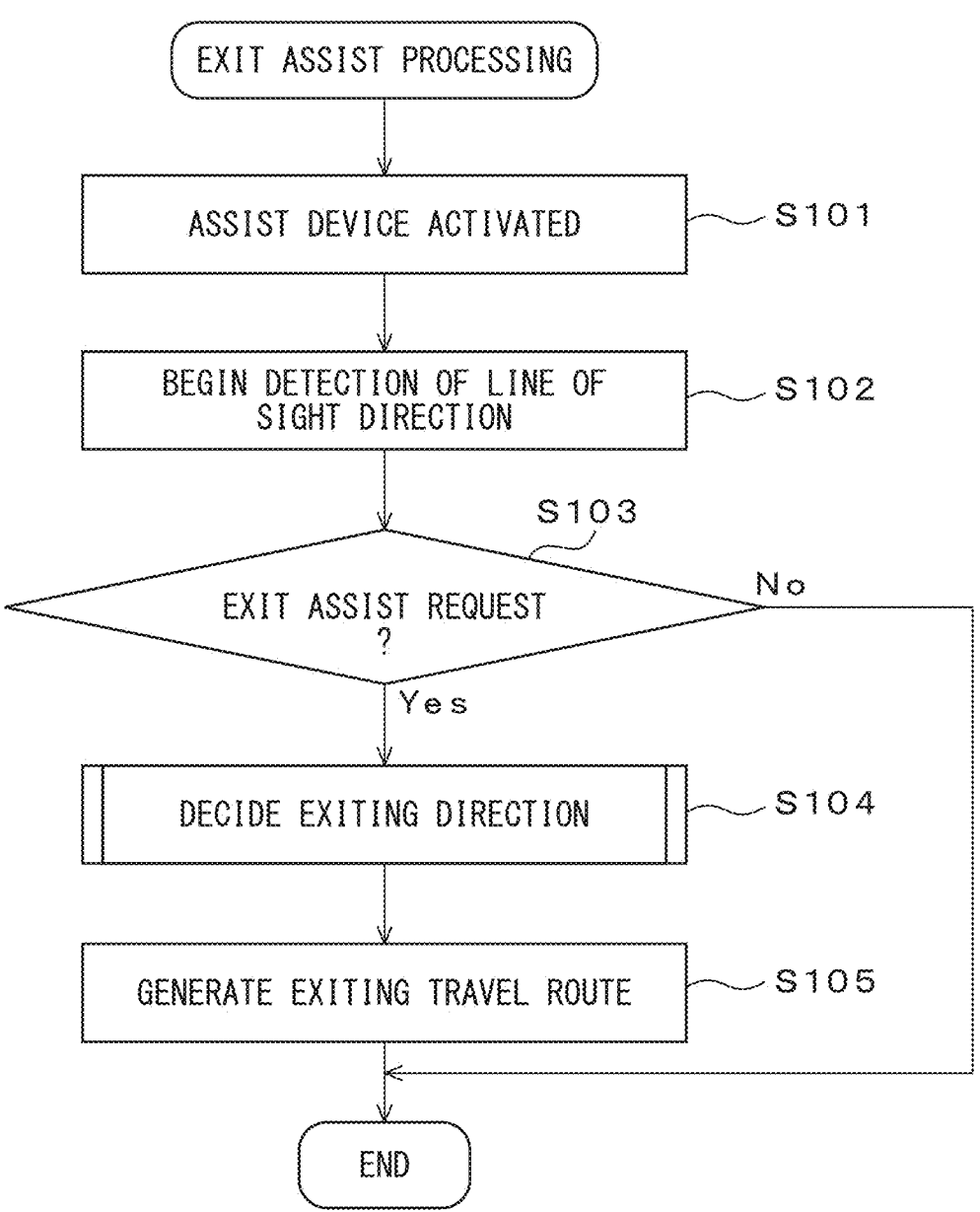
FIG. 3 is an example of an operation flow chart for exit assist processing by the assist device of the embodiment.

FIG. 3 is an example of an operation flow chart for exit assist processing by the assist device 13 of the embodiment. The assist device 13 executes an exit assist according to the operation flow chart shown in FIG. 3, each time the driver 40 riding in the vehicle 10 which is parked in the parking space turns on the ignition and the assist device 13 is activated.

First, the driver 40 riding in the vehicle 10 turns on the ignition. The assist device 13 is thereby activated (step S101). The camera sensors 2a to 2d, sonar sensors 3a to 3l, speed sensor 4, angular velocity sensor 5, monitoring camera 6, user interface (UI) 7, object detector 11 and automatic control device 12 are simultaneously activated together with the assist device 13.

Next, the estimating unit 232 begins to estimate the direction of the line of sight of the driver 40 based on a monitor image (step S102). The direction of the line of sight detected by the estimating unit 232 is represented as angles in the horizontal direction and perpendicular direction with respect to the forward orientation of the vehicle 10. For example, in the horizontal direction, the line of sight direction is represented as an angle of up to 90° on the right side and an angle of up to −90° on the left side, with 0° as the forward orientation of the vehicle 10. In the vertical direction, the line of sight direction is represented as an angle of up to 90° at the upper end and an angle of up to −90° on the lower end, with 0° as the forward orientation of the vehicle 10.

The estimating unit 232 detects the direction of the line of sight at predetermined time intervals, generating a frequency distribution for the line of sight direction represented in 10° intervals from −90° to 90°. The time interval used may be 0.2 second to 1 second, for example. The frequency distribution continues to be generated until determination is made in step S103 described below.

In some embodiments, from the viewpoint of detecting the line of sight when the driver 40 has the line of sight directed outward from the window of the cabin 30, the estimating unit 232 counts the frequency during the time while the line of sight of the driver 40 is within a predetermined range in the vertical direction. The range in the vertical direction may be set based on the positional relationship between the location of the driving seat 31 and the window.

The deciding unit 233 then determines whether or not an exit assist request has been made (step S103). To make an exit assist request, the driver 40 operates the UI 7 to input the exit assist request. The deciding unit 233 determines that an exit assist request has been made when a parking assist request has been input before the vehicle 10 has begun to travel.

On the other hand, the deciding unit 233 determines that a parking assist request has not been made when no parking assist request has been input before the vehicle 10 has begun to travel. When a parking assist request has not been made (step S103—No), the series of processing steps is complete. When the driver 40 has executed operation for exiting from the parking space, no parking assist request is input.

When a parking assist request has been made (step S103—Yes), the deciding unit 233 decides on the exiting direction for the vehicle 10 to exit from the parking space, based on the direction of the line of sight of the driver 40 (step S104). The deciding unit 233 notifies the recognition unit 231 of the exiting direction. Exit direction decision processing by the deciding unit 233 will be described below with reference to FIG. 4 and FIG. 5.

The recognition unit 231 then generates a traveling route for the vehicle 10 to exit based on the exiting direction relayed by the deciding unit 233 (step S105), notifying the automatic control device 12 of the traveling route, and the series of processing steps is complete. The recognition unit 231 also relays the exiting direction of the vehicle 10 to the driver 40 via the UI 7. The automatic control device 12 causes the vehicle 10 to exit the parking space based on the traveling route.

Exit direction decision processing by the deciding unit 233 will now be explained with reference to FIG. 4 and FIG.

5. FIG. 4 is an example of an operation flow chart for exit direction decision processing by the assist device of the embodiment.

First, the deciding unit 233 acquires the front-back direction of the vehicle 10 and the direction in which it can exit, from the recognition unit 231 (step S201). The front-back direction represents whether the vehicle 10 is to exit forwards or exit backwards from the parking space. The direction in which the vehicle 10 can exit is represented as an angle in the horizontal direction with respect to the front of the vehicle 10. For example, the direction in which it can exit to the left side is represented in the range of −90° to −30°, with 0° as the forward orientation of the vehicle 10. The direction in which it can exit to the right side is represented in the range of +30° to +90°, with 0° as the forward orientation of the vehicle 10.

Next, the deciding unit 233 calculates the time for orientation of the line of sight of the driver 40 in each of the multiple directions in which it can exit, based on the frequency distribution for the line of sight direction generated by the estimating unit 232 (step S202).

For example, the deciding unit 233 calculates the sum of the frequencies of line of sight directions distributed in the range of −90° to −30°, as the time for which the line of sight of the driver 40 is oriented to the left side. Likewise, the deciding unit 233 calculates the sum of the frequencies of line of sight directions distributed in the range of +30° to +90°, as the time for which the line of sight of the driver 40 is oriented to the right side.

The deciding unit 233 then decides on the exiting direction as the direction with the longest time for orientation of the line of sight of the driver 40 from among the multiple directions in which the vehicle 10 can exit (step S203), and the series of processing steps is complete.

Figure 4:
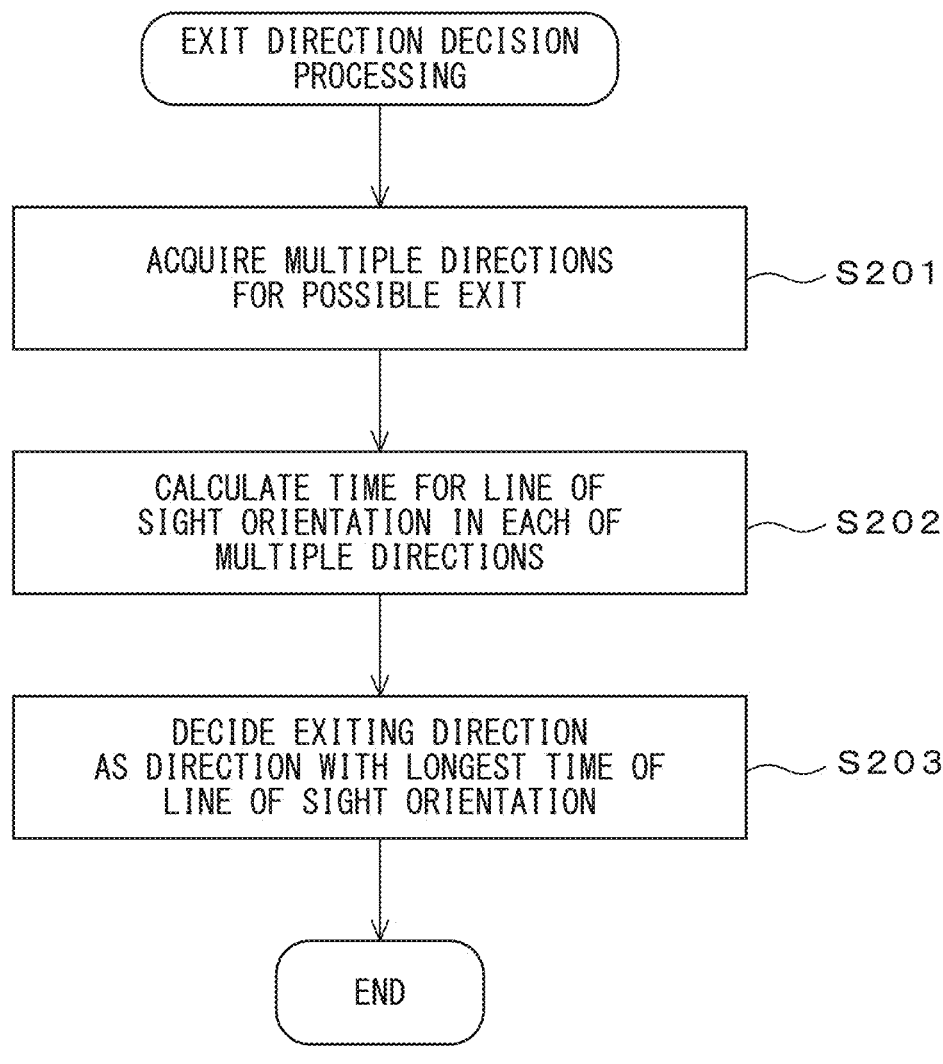
FIG. 4 is an example of an operation flow chart for exit direction decision processing by the assist device of the embodiment.
Figure 5:
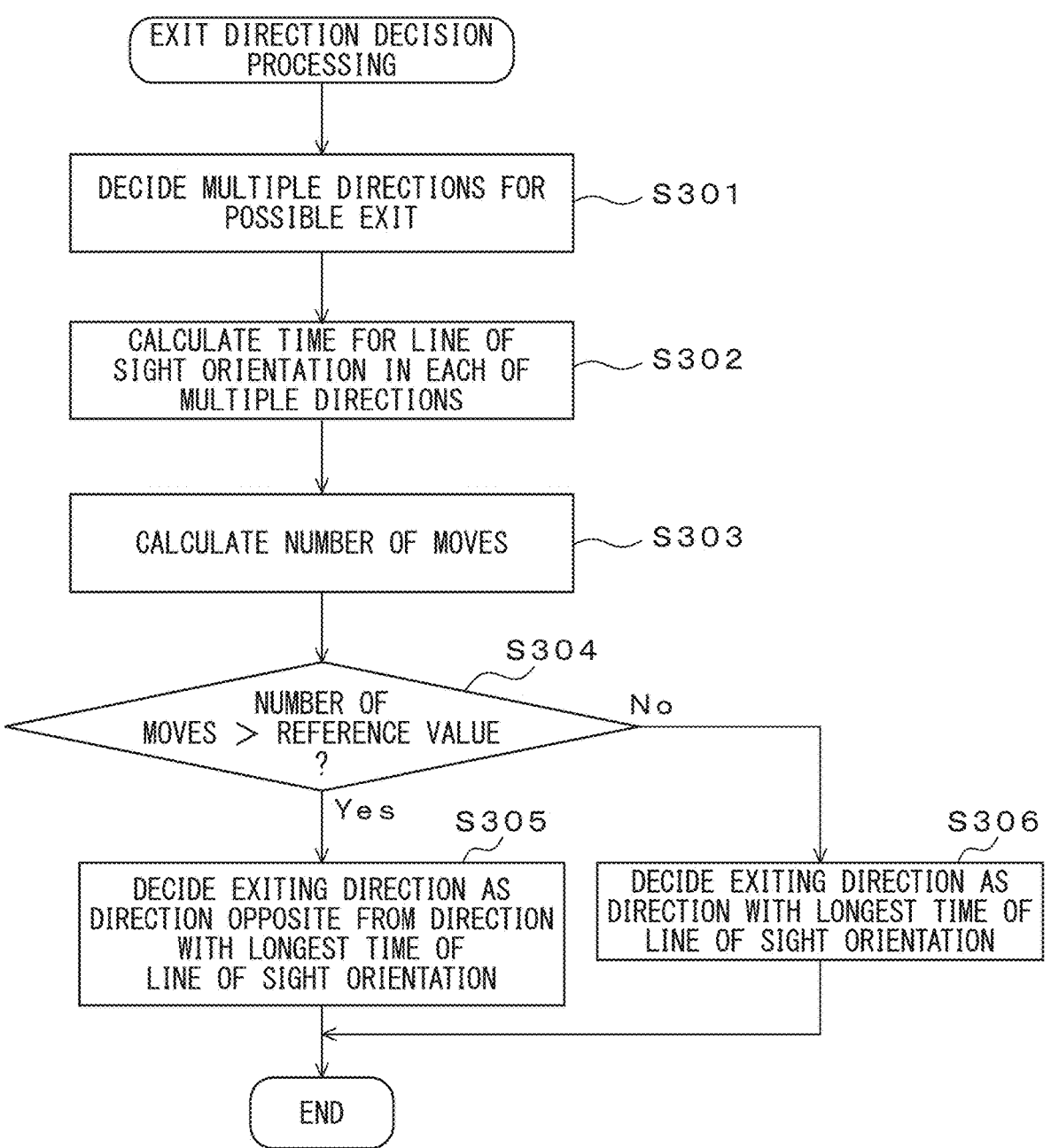
FIG. 5 is another example of an operation flow chart for exit direction decision processing by the assist device of the embodiment.

Incidentally, exit direction decision processing by the deciding unit 233 is not limited to the example depicted in FIG. 4. For example, the deciding unit 233 may carry out exit direction decision processing according to the operation flow chart shown in FIG. 5. FIG. 5 is another example of an operation flow chart for exit direction decision processing by the assist device of the embodiment.

For the operation flow chart shown in FIG. 5, steps S301, S302 and S306 are the same as steps S201, S202 and S203 in the operation flow chart of FIG. 4. The explanation regarding steps S301, S302 and S306 apply as appropriate for steps S201, S202 and S203 as well.

After the time for orientation of the line of sight of the driver 40 has been calculated for each of the multiple directions in which the vehicle can exit (step S302), the detecting unit 234 calculates the number of moves for which objects move around the vehicle 10, based on object detection information (step S303).

After the object detector 11 has been activated, the object detector 11 outputs object detection information representing the objects detected around the vehicle 10 to the assist device 13. The detecting unit 234 calculates the number of moves to be the number of objects detected in front of or behind the vehicle 10, based on the object detection information. Objects include other vehicles and pedestrians, for example. When the vehicle 10 is to exit forward from the parking space, the number of moves of objects moving in front of the vehicle 10 are calculated. When the vehicle 10 is to exit backward from the parking space, the number of moves of objects moving behind the vehicle 10 are calculated.

In FIG. 1A, for example, the vehicle 10 exits forward from the parking space. The detecting unit 234 calculates the number of moves of objects moving in front of the vehicle 10.

The detecting unit 234 then determines whether or not the number of moves exceeds a predetermined reference value (step S304). When the number of objects moving around the parked vehicle 10 is large, the driver 40 will tend to confirm the presence or absence of objects approaching from the direction opposite from the exiting direction in which the vehicle 10 will be made to exit. When the number of objects moving around the parked vehicle 10 is small, on the other hand, the driver 40 will tend to confirm the presence or absence of objects approaching from the exiting direction in which the vehicle 10 will be made to exit. The reference value may be 3 to 5, for example.

When the number of moves exceeds the reference value (step S304—Yes), the deciding unit 233 decides on the exiting direction as the direction opposite from the direction with the longest time for orientation of the line of sight of the driver 40, from among the multiple directions in which the vehicle can exit (step S305), and the series of processing steps is complete.

In the example shown in FIG. 1A, the multiple directions in which the vehicle can exit are the left side and right side. For example, when the number of moves exceeds the reference value and the direction with the longest time for orientation of the line of sight of the driver 40 is the right side, the exiting direction is the left side.

When the number of moves does not exceed the reference value (step S304—No), on the other hand, the deciding unit 233 decides on the exiting direction as the direction with the longest time for orientation of the line of sight of the driver 40, from among the multiple directions in which the vehicle can exit (step S306), and the series of processing steps is complete.

In the example shown in FIG. 1A, the multiple directions in which the vehicle can exit are the left side and right side. For example, when the number of moves does not exceed the reference value and the direction with the longest time for orientation of the line of sight of the driver 40 is the left side, the exiting direction is the left side.

As explained in detail above, the assist device of the embodiment assists the vehicle to exit from its parking space in a manner based on the line of sight of the driver, and it can therefore alleviate burden on the driver.

The exit assist device, computer program for exit assist, and exit assist method according to the embodiment described in the present disclosure may incorporate appropriate modifications that still fall within the gist of the disclosure. Moreover, the technical scope of the disclosure is not limited to these embodiments, and includes the present disclosure and its equivalents as laid out in the Claims.

For example, in the embodiment described above the vehicle parked backwards in the parking space and exited forwards from the parking space when exiting. However, the present disclosure may be applied even in cases where the vehicle parks forwards in the parking space and exits backwards from the parking space when exiting. The estimating unit of the assist device detects the direction of the line of sight of the driver in the following manner after it has been notified by the recognition unit that the vehicle is to exit backwards. First, the estimating unit determines whether or not the line of sight of the driver is oriented in the direction of the rearview mirror 32 (FIG. 1). If the line of sight of the driver is oriented toward the rearview mirror 32, then the estimating unit detects the line of sight direction of the driver. If the vehicle is parked forwards in the parking space, the driver looks at the rearview mirror 32 to confirm the environment in the direction in which the vehicle is to exit. As was explained above, the line of sight direction is represented as either the left side or the right side with respect to the forward orientation of the vehicle.

Furthermore, for the embodiment described above the vehicle was parking in a marked parking space, but the vehicle may also be parking in a space that is not marked by marking lines. The assist device may assist parking of a vehicle in any space in which it is able to park. The assist device may assist exiting of the vehicle from a space in which it is parked, even if the space is not marked by marking lines.

The invention claimed is:

1. An exit assist device comprising:

a processor configured to:

estimate a direction of a line of sight of a driver based on an image in which a vicinity of a driving seat is represented, recognize multiple directions in which a vehicle can exit from a parking space, based on information representing surrounding environment of the vehicle, decide on an exiting direction from among the multiple recognized directions in which the vehicle is to exit from the parking space, based on the direction of the line of sight of the driver, generate a traveling route for the vehicle to exit from the parking space based on the exiting direction, and notify an automatic control device of the traveling route, and in response, the automatic control device is configured to autonomously control the vehicle to exit from the parking space along the generated traveling route in accordance with the notification.

2. The exit assist device according to claim 1, wherein the processor is further configured to decide on the exiting direction as the direction with the longest time for orientation of the line of sight of the driver from among the multiple recognized directions.

3. The exit assist device according to claim 1, wherein the processor is further configured to:

detect a number of moves for which objects move around the vehicle, based on information representing surrounding environment of the vehicle, and decide that the exiting direction is the direction opposite from the direction with the longest time for orientation of the line of sight of the driver from among the multiple recognized directions, when the detected number of moves exceeds a predetermined reference value, or decide that the exiting direction is the direction with the longest time for orientation of the line of sight of the driver from among the multiple recognized directions, when the detected number of moves does not exceed the reference value.

4. An exit assist method which is carried out by an exit assist device and the method comprising:

estimating a direction of a line of sight of a driver based on an image in which a vicinity of a driving seat is represented;

recognize multiple directions in which a vehicle can exit from a parking space, based on information representing surrounding environment of the vehicle, deciding on an exiting direction from among the multiple recognized directions in which the vehicle is to exit from the parking space, based on the direction of the line of sight of the driver;

generating a traveling route for the vehicle to exit from the parking space based on the exiting direction, and notifying an automatic control device of the traveling route, and in response, the automatic control device is configured to autonomously control the vehicle to exit from the parking space along the generated traveling route in accordance with the notification.

* * * * *